United States Patent
Perrot (10) Patent No.: US 7,934,009 B2
(45) Date of Patent: Apr. 26, 2011

(54) DISCOVERY INFORMATION FOR IP MULTICAST

(75) Inventor: Philippe Perrot, Paris (FR)

(73) Assignee: Thomson Licensing, Issy les Moulineaux (FR)

( * ) Notice: Subject to any disclaimer, the term of this patent is extended or adjusted under 35 U.S.C. 154(b) by 779 days.

(21) Appl. No.: 10/519,236

(22) PCT Filed: Aug. 8, 2002

(86) PCT No.: PCT/EP02/08631
§ 371 (c)(1),
(2), (4) Date: Jan. 12, 2006

(87) PCT Pub. No.: WO04/002146
PCT Pub. Date: Dec. 31, 2003

(65) Prior Publication Data
US 2006/0156362 A1   Jul. 13, 2006

(30) Foreign Application Priority Data
Jun. 25, 2002 (EP) .................... 02291585

(51) Int. Cl.
*G06F 15/16* (2006.01)
*G06F 3/00* (2006.01)
*G06F 13/00* (2006.01)
*H04N 5/445* (2011.01)
*H04N 7/173* (2011.01)

(52) U.S. Cl. ............. 709/231; 725/38; 725/50; 725/90; 725/100; 725/110

(58) Field of Classification Search .................... 709/231
See application file for complete search history.

(56) References Cited

U.S. PATENT DOCUMENTS

| 6,351,467 B1 | 2/2002 | Dillon |
| 2002/0023165 A1 | 2/2002 | Lahr |
| 2002/0034179 A1 | 3/2002 | Sodergard et al. |
| 2005/0028206 A1* | 2/2005 | Cameron et al. ............... 725/46 |
| 2006/0212921 A1* | 9/2006 | Carr ............................. 725/136 |

FOREIGN PATENT DOCUMENTS

| EP | 0964581 A | 12/1999 |
| EP | 0964581 A1 | 12/1999 |
| WO | WO-00/70840 | 11/2000 |
| WO | WO-0070840 | 11/2000 |
| WO | WO-01/14986 A1 | 3/2001 |
| WO | WO-0114986 A | 3/2001 |

OTHER PUBLICATIONS

EPO Search Report dated Oct. 16, 2002, regarding EPO Application No. 02291585.4-2202 (3 pages).

* cited by examiner

Primary Examiner — Kevin Bates
Assistant Examiner — Angela Nguyen
(74) Attorney, Agent, or Firm — Osha • Liang LLP (57) ABSTRACT

A method for broadcasting over an IP multicast network an offer of multimedia services received in form of a bundle of transport streams, comprises attributing for each offer (offer 1, offer 2) a determined service provider offer localization ($LN_{0,1}$, $LN_{0,2}$) of the IP multicast network, and creating a file of offer information (701) describing for each offer a relation to it attributed service provider offer localization. For each offer transport stream information is extracted from its bundle, the transport stream information comprising a transport stream identification ($TS¿1,1$ ? $TS_{1,4}$, $TS_{2,1}$ $TS_{2,3}$) for each transport stream. For each transport stream identification is attributed a determined stream localization ($LN_{1,1}$ $LN_{1,4}$, $LN_{2,1}$ $LN_{2,3}$) within the IP multicast network. For each offer is created a file of stream information (702, 703) describing for each transport stream a relation to its attributed stream localization.

11 Claims, 8 Drawing Sheets

PRIOR ART

FIG. 1

PRIOR ART

| Stream Discovery Information | | |
|---|---|---|
| Transport Stream(s) | | Description |
| | Original network Id | Gives the network Id of the originating delivery system |
| | TS Id | Identifies the Transport Stream |
| | Localisation | TS physical address |
| | Address | IP multicast address |
| | Port | Port number |

FIG. 10

DISCOVERY INFORMATION FOR IP MULTICAST

FIELD OF THE INVENTION

The invention relates to the delivery of multimedia services from a DVB compliant bundle to subscribers connected to an IP network. The services are delivered over IP multicast.

BACKGROUND OF THE INVENTION

Broadcast of Multimedia Services

Digital multimedia services such as for example television broadcast are currently delivered through service providers such as cable companies, satellite operators and, of course, direct terrestrial broadcast reception via traditional antennas. Conventional cable service requires the installation of a dedicated cable to the subscriber's residence. Satellite broadcast service requires that the users have a satellite dish located on or somewhere close to their residence. Antennas are generally limited to the reception of local programming.

Figure 1:
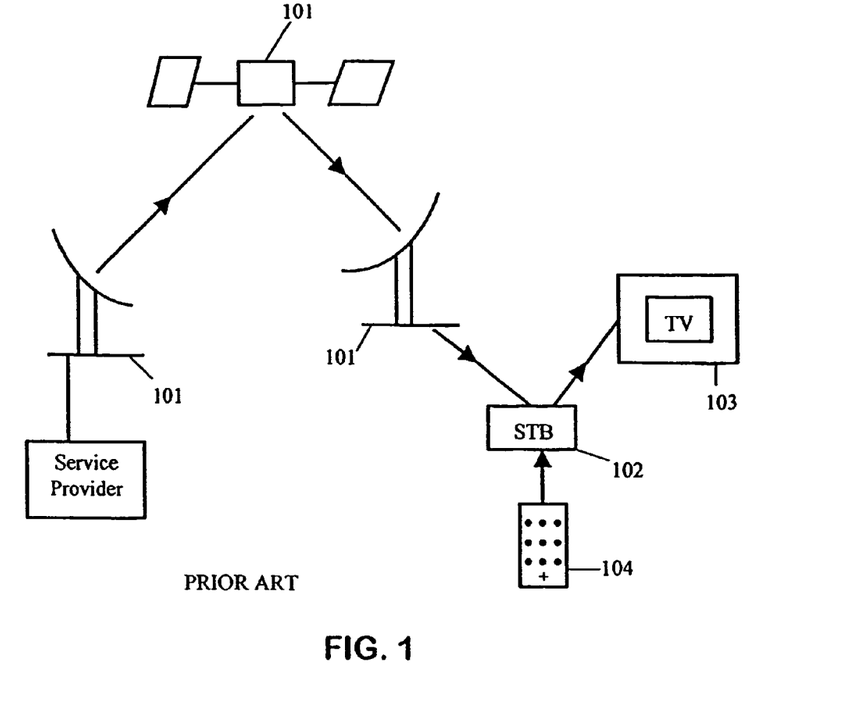
FIG. 1 shows a network system for broadcasting a DVB compliant bundle according to prior art.

FIG. 1 schematically shows a service provider 100 and satellite broadcast/reception equipment 101 used to deliver digital multimedia services to a subscriber.

The multimedia services are delivered to subscribers equipped with a Set Top Box (STB) 102 or any other device that allows to receive, decode and process the broadcast services. Other examples for such devices are a personal computer or a decoder integrated in a television set. The STB is connected to an audiovisual display 103 which allows to render graphics and sounds produced at an output of the STB as a result of processing. The STB receives instructions from a user through a control interface such as for example a remote control 104 or a keyboard. This allows to instruct the STB to switch from one service to another, e.g. to switch from one television channel to another.

The service providers may broadcast the multimedia services in the frame of an offer and according to a widespread regional standard, e.g., the DVB-SI (used in Europe) and ATSC-PSIP (used in the US) standards which are used for satellite and terrestrial broadcast, or the SCTE (used in the US) which is similar to the ATSC-PSIP standard but applied to cable networks. The standards each include similar functionalities including the use of service information in transport stream. The standards are well known and described in the art. The offer typically comprises a plurality of services, such as for example audio and/or visual programmes, data services or applications. Each service may be transmitted in data packets according to a well known MPEG-2 standard. The data packets are multiplexed in transport streams. A transport stream may therefore carry a plurality of services of the offer. Due to bandwidth reasons, the service provider may decide to use more than one transport stream to transport the services, each one of the transport streams being broadcast at a predetermined frequency. The transport streams are part of a regional standard compliant bundle. Furthermore each transport stream includes tables of Service information (SI) which indicates for example which services are available in a determined transport stream, or at which frequency the transport streams are broadcast.

In order to receive, decode and process the services, the STB is MPEG and regional standard compliant. The STB extracts and processes service information which allows for example to retrieve a description of a service and subsequently to select a service by tuning to a corresponding transport stream and filtering data packets.

IP-Based Multicast

Figure 2:
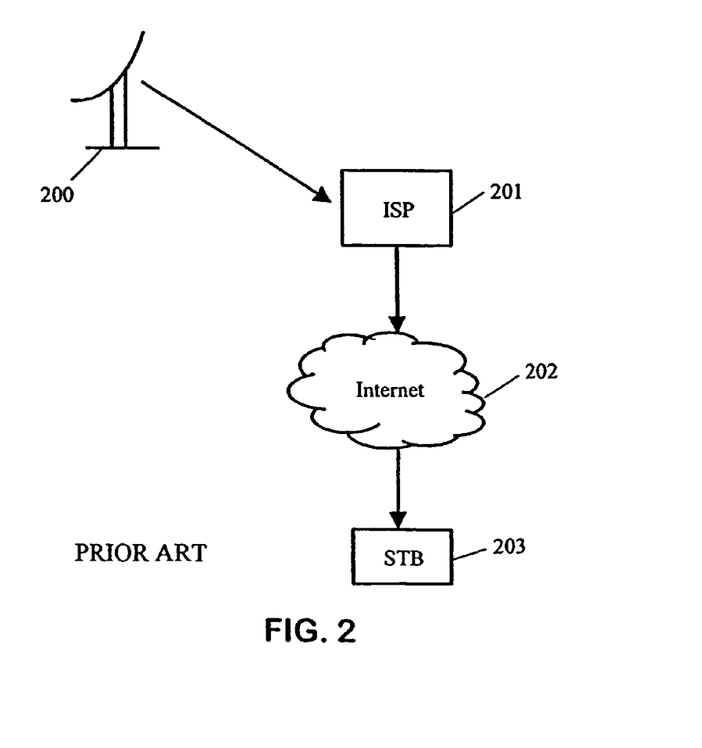
FIG. 2 shows a network system for UP multicasting services according to prior art.

IP based multicast relies on an infrastructure, in which an Internet Service Provider (ISP) operates the multicasting of audio/visual content with or without interactivity from various multimedia service operators and all the associated signalisation. Referring to FIG. 2, audio/visual content received for example from a satellite dish 200 is encapsulated in IP compliant format by an ISP 201 and multicast on the internet 202.

IP based multicast bears the possibility to easily combine the offers of a plurality of service providers that may deliver their programs over various types of distribution systems (cable network, satellite, terrestrial). All offers may be combined and brought to the subscriber using the internet. Hence the subscriber requires only one access, i.e. an access to the internet. This provides flexibility both to the ISP and to the subscriber.

The subscribers of the IP based multicast service providers have an IP compliant STB 203 and require a connection to the internet. Possible types of connections to the internet include a PSTN telephone network, an ADSL connection or a permanent broadband connection such as a fibreglass or cable network line.

A bandwidth of the connection to the internet may considerably vary depending on the type of connection used. The limitations of the available bandwidth has encouraged to develop IP based multicast systems which allow to selectively multicast a limited number of services from one localization (hereinafter used as "localization" which is consistent with the British English spelling) (IP address and port pair) to a range of subscribed STBs, e.g., a determined set top box obtains the services the has subscribed to only. It appears that the typical bandwidth available for internet connections is often at least one order of magnitude smaller than a bandwidth available in conventional cable networks or Satellite broadcast systems.

In known IP multicast networks, the STB may send requests to the ISP for receiving data, thereby submitting a localisation, i.e. an IP multicast address and port pair at which the data is being multicast. In response to the request, corresponding IP data packets are routed to the STB.

An example of an IP based multicast is described in WO99/63759. The described system is used to broadcast content based on IP multicast using for example ADSL connections to reach set top boxes. The system allows to retrieve broadcast television signals and to configure these signals into IP format for transmission over a network. Furthermore the system comprises a management system for managing a subscriber's access to the television signals. The subscriber may select television programs using an Interactive Program Guide (IPG). The subscriber accesses the IPG through the Set Top Box (STB). In the STB implementation some memory may be available locally for storing specific information, or alternatively, the entire IPG is maintained in the network. The system further has a Digital TV Manager (DTVM), distinct from the STB, that provides end to end management of services and resources of the integrated broadcast delivery system. The DTVM in conjunction with the IPG provides a subscriber with the ability to channel browse for TV programs. Data delivered to the IPG is tailored by the provider based on a number of parameters such as the customer profile.

Another example of an IP based multicast system may be found in WO99/31871. This system was specifically designed to take into account the limited bandwidth of subscriber's internet connection. One or more central channel server(s) collect(s) information about available programming services distributed from a multiplicity of content providers. The channel server maintains a channel list database which tracks available content channel offerings and a subscriber database, which contains subscriber identifications and permitted channels for each subscriber. The subscriber sends requests for programs to the channel server which checks the request and enables a flow of channel programming from the content provider to the subscriber's STB.

In both WO99/31871 and WO99/63759, the subscriber is in communication with a server that receives and processes requests for programs. The flow of the program to the subscriber's STB is enabled only if the subscriber's request is found by the server to be valid. In order to provide this functionality, the server needs to process channel information from the content providers and to maintain a subscriber database.

It appears that the bandwidth of subscriber's internet connections is increasing as fibreglass networks or other performing technologies are being deployed. The bandwidth is often reaching values which is comparable with that of bandwidth available in conventional cable networks or Satellite broadcast systems.

SUMMARY OF THE INVENTION

In a first aspect the invention provides a method for distributing discovery information in an IP multicast television network. The method comprises multicasting offer information linking a service provider offer description and a service provider offer localisation within the IP multicast network. The method further comprises multicasting stream information at the service provider offer localisation, the stream information linking a multi service transport stream and a stream localisation within the IP multicast network.

In a second aspect the invention provides a method for broadcasting over an IP multicast network at least one offer of multimedia services received in form of a bundle of transport streams. For each offer, a determined service provider offer localisation within the IP multicast network is attributed. A file of offer information describing for each offer a relation to its attributed service provider offer localisation is created. For each offer, transport stream information is extracted from its bundle, the transport stream information comprising a transport stream identification for each transport stream. The method further comprises attributing for each transport stream identification a determined stream localisation within the IP multicast network, and creating for each offer a file of stream information describing for each transport stream a relation to its attributed stream localisation.

In a preferred embodiment the method comprises adding for each offer a service provider offer description in the file of offer information.

In a further preferred embodiment, for each transport stream a corresponding stream of packetized data is received and the packetized data inserted into IP packets. The IP packets are multicast at the stream localisation previously attributed to the transport stream, and the file of offer information is multicast at a predetermined offer localisation. For each offer the corresponding stream information file is multicast at the service provider offer localisation attributed to the offer.

In a third aspect the invention provides a method for receiving in a set top box receiver compliant to receive a bundle of transport streams and connected to an IP multicast network, a transport stream from a bundle. The method comprises obtaining multicast stream information from a service provider offer localisation, processing the stream information to determine a stream localisation previously attributed to the transport stream, obtaining multicast IP packets from the stream localisation, and extracting packetized data from the obtained IP packets, thereby obtaining the transport stream.

In a fourth aspect the invention provides a method for receiving in a set top box receiver compliant to receive a bundle of transport streams and connected to an IP multicast network, a transport stream from an offer among one or many offers in form of bundles. Multicast offer information is obtained from a predetermined offer localisation, and processed to obtain a determined service provider offer localisation previously attributed to the offer. Multicast stream information is obtained from the determined service provider offer localisation, and processed to determine a stream localisation previously attributed to the transport stream. Multicast IP packets are obtained from the stream localisation, and packetized data extracted from the obtained IP packets, thereby obtaining the transport stream.

In a fifth aspect the invention provides a method for receiving in a set top box receiver compliant to receive a bundle of transport streams and connected to an IP multicast network, a transport stream from an offer among one or many offers in form of bundles. Multicast offer information is obtained from a predetermined offer localisation, and processed to obtain a list of items, each item relating a service provider offer localisation and an offer. For each item multicast stream information is obtained from the service provider offer localisation corresponding to the item, and processed to obtain a transport stream list of transport streams and respectively related stream localisations. The transport stream list is stored in the set top box.

In another preferred embodiment a determined transport stream is requested and a stream localisation corresponding to the determined transport stream found in the transport stream list. Multicast IP packets are obtained from the stream localisation, and packetized data extracted from the obtained IP packets, thereby obtaining the determined transport stream.

BRIEF DESCRIPTION OF THE FIGURES

The invention will now be described in greater detail with reference to the accompanying drawings, in which.

DESCRIPTION OF THE PREFERRED EMBODIMENTS

General Overview

Figure 3:
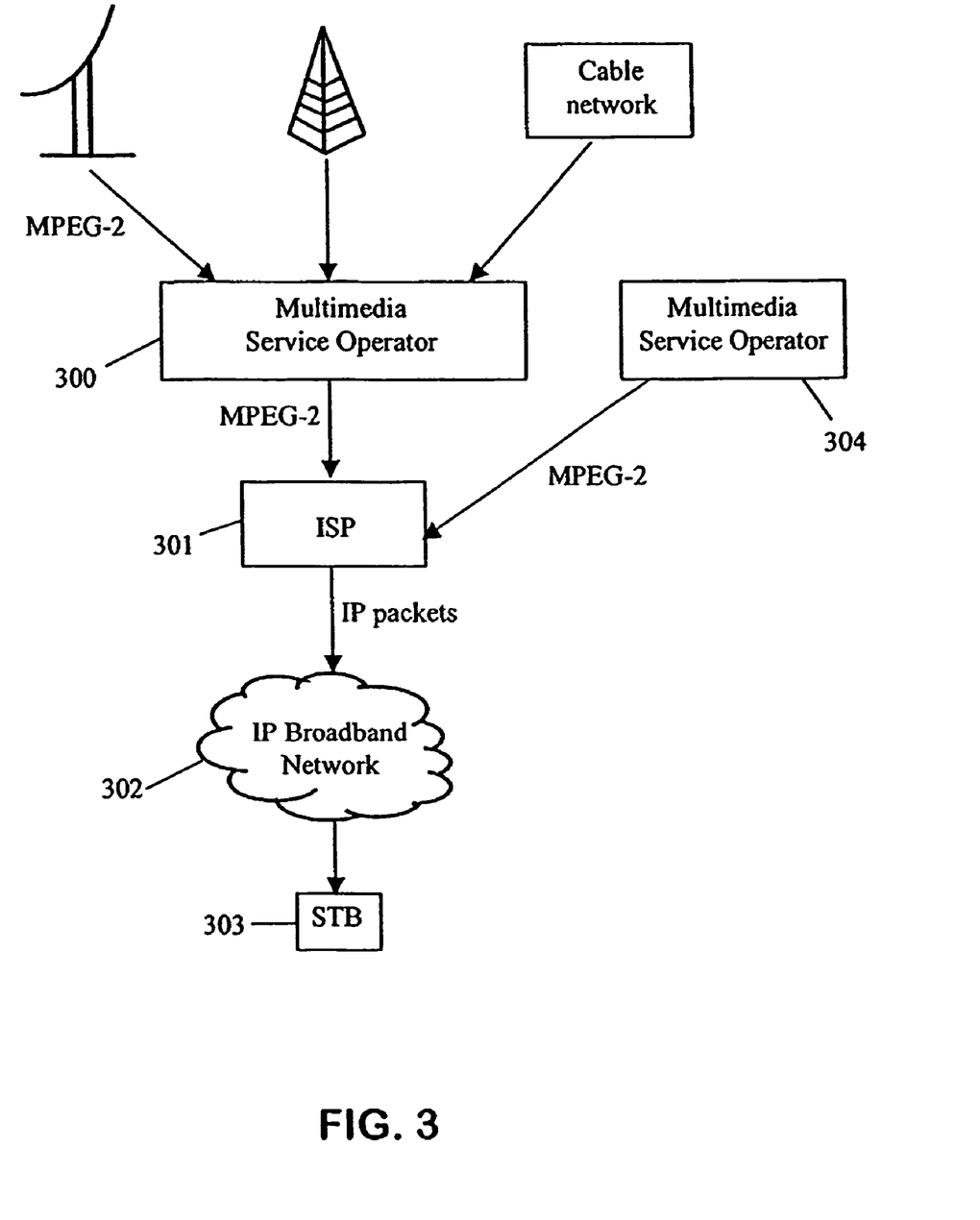
FIG. 3 shows an example of a network system as used in the invention.

Referring to FIG. 3, a Multimedia Service Operator (MSO) 300 selects multimedia services broadcast over satellite, terrestrial and cable. The selection shown in FIG. 3 represents an example, and it may be varied in any combination of the suggested or any other known broadcast means. The multimedia services are delivered in digital television transport streams broadcast according to a regional standard such as for example the DVB broadcast standard. At this stage the transport streams are in MPEG-2 standard format. The MSO provides the MPEG-2 transport streams to an IP delivery network operator, such as for example an Internet Service Provider (ISP) 301. The transport streams are IP encapsulated by the ISP 301 and multicast on an IP broadband network 302. The network 302 may for example be the internet or a proprietary IP network. Subscribers each have a STB 303 which is connected to the IP broadband network to receive IP data packets from the ISP 302.

There may be additional MSOs, e.g., an MSO 304, providing transport streams to the ISP 302.

Alternatively, it would be possible to IP encapsulate the transport stream at the level of the MSOs instead of the ISP, and to deliver the IP encapsulated transport stream to the ISP before multicast.

The MSOs generate discovery information needed at the receiver side, i.e., at the STB 303 side to be able to locate the different transport streams. More precisely the discovery information is required by the STB to localise an IP multicast transport stream, i.e., to know at which IP address and port the corresponding IP packets may be received. The discovery information is inserted into one or many textual files, e.g. into the well known XML textual file format, and IP multicast on the IP broadband network 302 for the STB 303. Typically the discovery information is cyclically multicast.

The STB 303 receives the XML textual files, extracts the discovery information and uses the discovery information to select a transport stream and to determine the localisation at which the transport stream is IP multicast. After receiving IP packets from the localisation, the MPEG-2 transport stream is decapsulated out of the IP packets. Further information necessary to discover actual services available over the received transport stream or indeed other transport streams, is afterwards acquired from the transport stream itself through classical use of service information as defined in the regional standard used for broadcasting the transport streams, e.g. the well known DVB-SI standard.

Data Model for Discovery Information

Figure 4A:
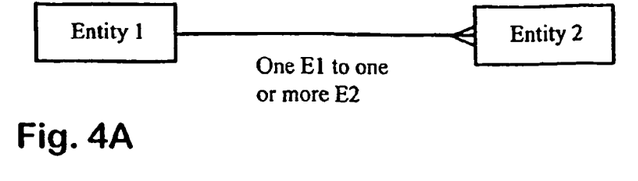
FIGS. 4A, 4B and 4C contains syntax diagrams for describing entity relation.
Figure 4B:
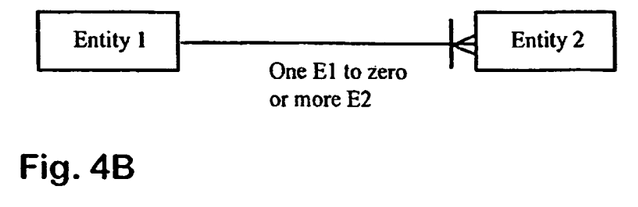
Figure 4C:
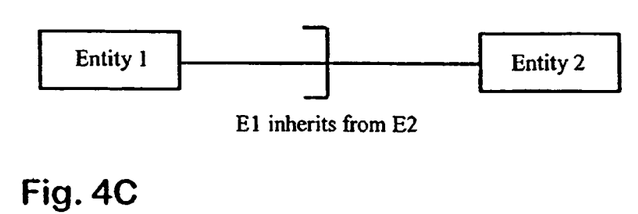

FIGS. 4A, 4B and 4C each represent an entity relation diagrammatic syntax that will be used to describe a data model for the discovery information.

FIG. 4A represents entities E1 and E2, where one entity E1 is in relation to one or many entities E2.

FIG. 4B represents a case in which one entity E1 is in relation to zero, one or many entities E2.

FIG. 4C represents a case in which one entity E1 inherits from one entity E2.

Figure 5:
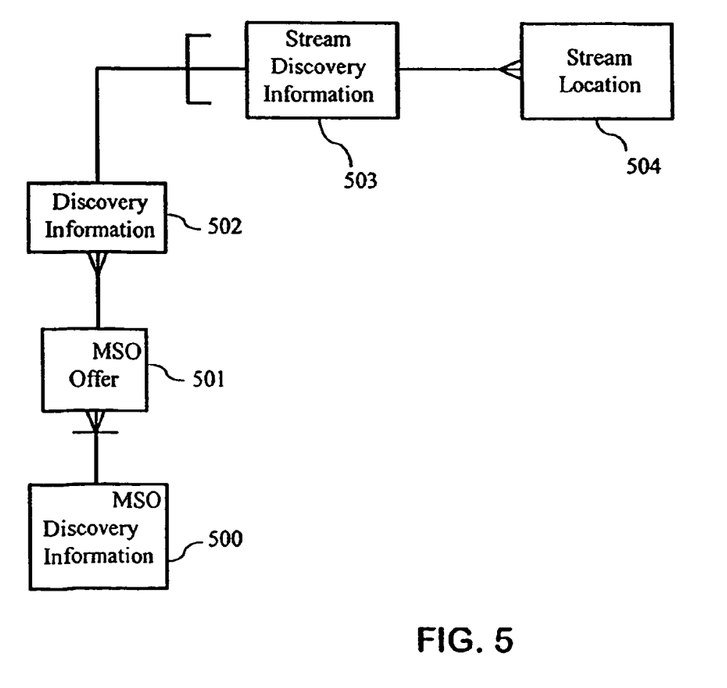
FIG. 5 contains a data model according to the invention.

Referring to FIG. 5, a data model for the discovery information generated by the MSO, i.e. MSO discovery information 500 is presented. Information in box 500 may comprise information about zero, one or a plurality of MSO offers 501.

As an example, in the case illustrated in FIG. 3, two MSOs 300 and 304 contribute to the information about their offers to the MSO discovery information.

Referring again to FIG. 5, the MSO offer 501 may correspond to one or many sources of discovery information 502. The nature of the discovery information 502 is described as a specialisation in Stream Discovery Information 503, that corresponds to information about transport streams available through IP multicast. The Stream Discovery Information 503 corresponds to one or many Stream localisations 504.

It is understood that the discovery information 502 may correspond also to other types of information than Stream Discovery Information 503. This may be the case if other data than transport streams are to be made available to the STB. One example of other data is a discovery information about a service that is being multicast, i.e., the discovery information comprises a name, a proprietary IP address and a port number for that service. Another example may be discovery information related to a Video On Demand service.

IP Multicast System for DVB Transport Streams

Figure 6:
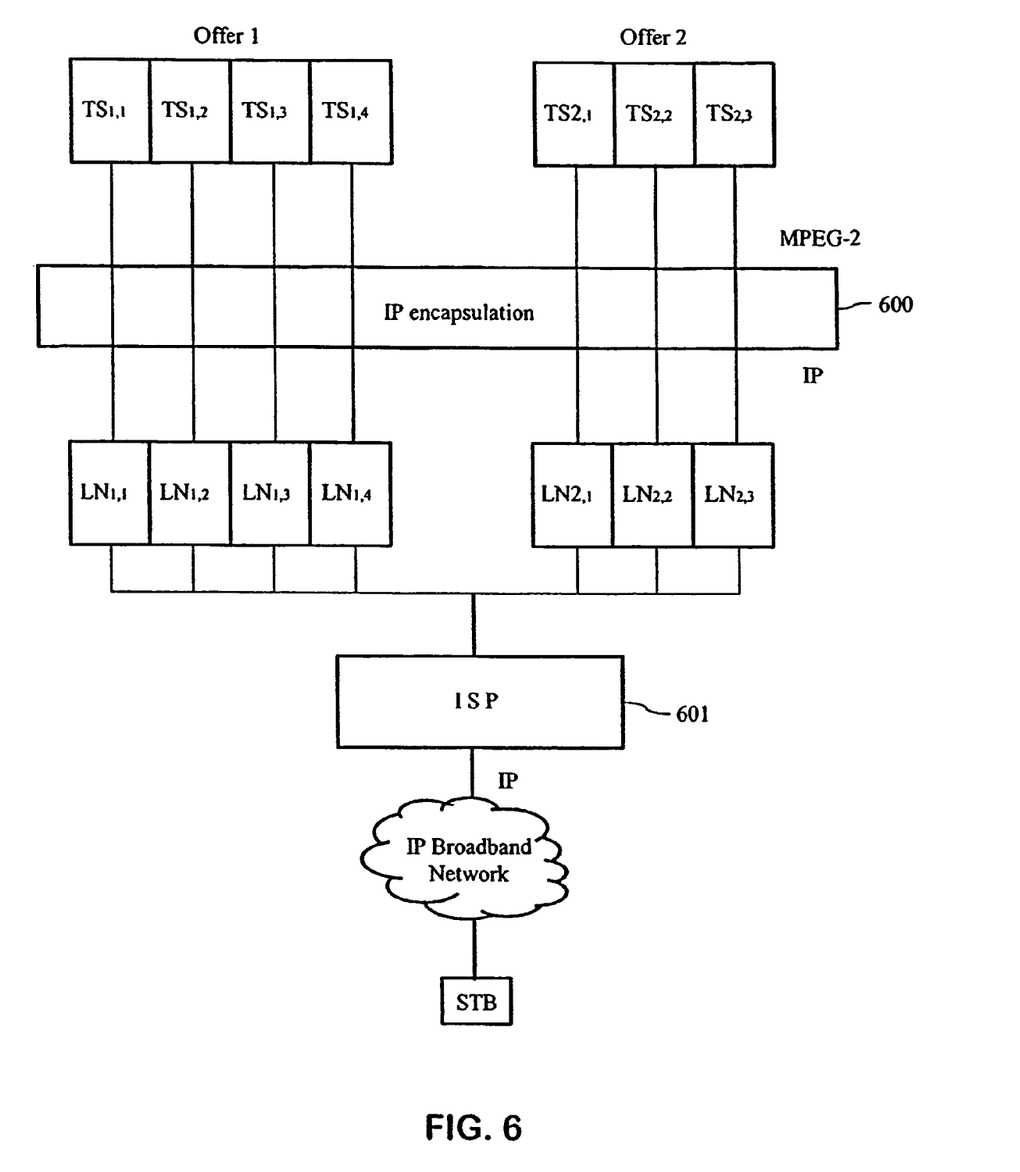
FIG. 6 schematically illustrates an example for multicasting transport streams according to the invention.

Referring to FIG. 6, a schematic representation of a system for bringing DVB transport streams to the STB of a subscriber using an IP broadcast network is shown.

In this example, two offers (Offer 1 and Offer 2) are provided. The offers may be provided through one or more MSOs (not shown).

The offers 1 and 2 respectively cover transport streams $TS_{1,1}$-$TS_{1,4}$ and $TS_{2,1}$-$TS_{2,3}$ available in MPEG-2 format. IP encapsulation in box 600 is used to encapsulate the transport streams, that are subsequently IP multicast at stream localisations respectively referenced by $LN_{1,1}$-$LN_{1,4}$ and $LN_{2,1}$-$LN_{2,3}$, by an ISP 601.

Example of Discovery Information

Figure 7:
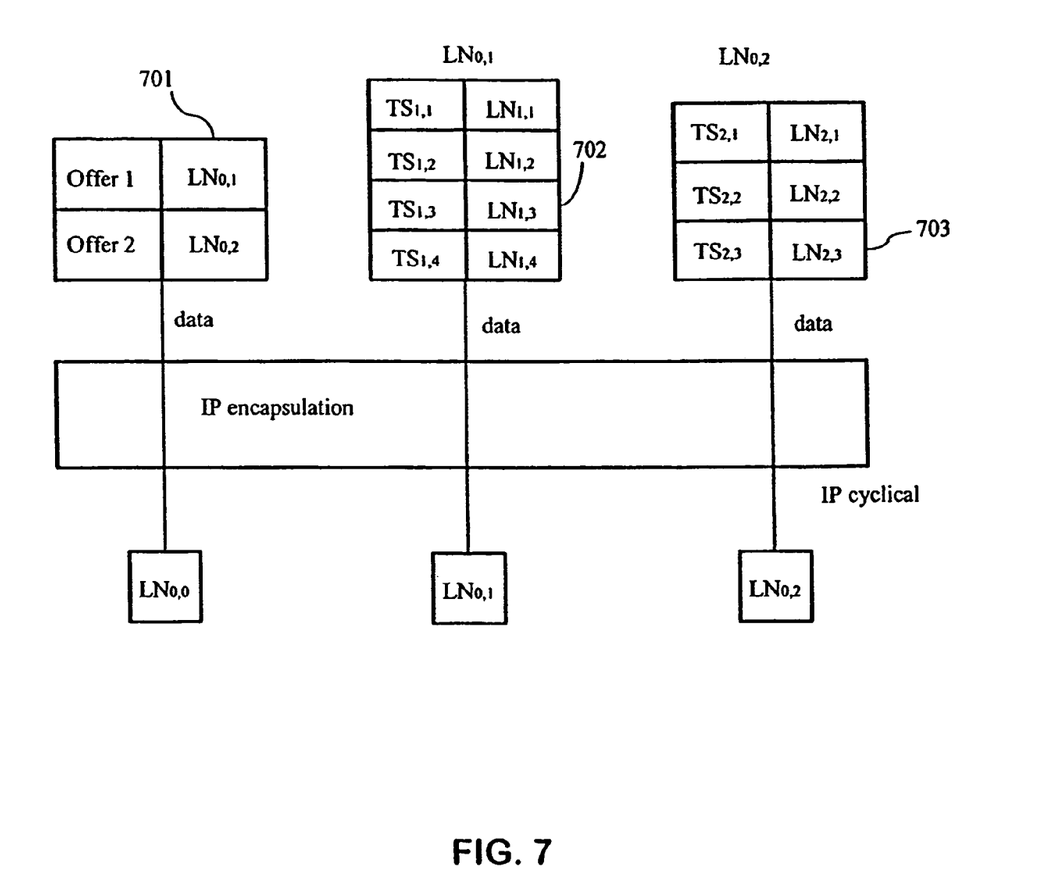
FIG. 7 schematically illustrates an example for offer and stream information according to the invention.

Referring to FIG. 7, a schematic example in which discovery information is obtained and multicast for the system shown in FIG. 6, is given.

A first table 701 of offer information is created that indicates for each offer 1 and 2, a service provider offer localisation respectively $LN_{0,1}$ and $LN_{0,2}$ at which it is intended to multicast stream information.

A second table 702 and a third table 703 of stream information are created for respectively offer 1 and 2. Each table contains a list of transport streams and corresponding stream localisations.

The stream information table 702 contains the list of transport streams $TS_{1,1}$-$TS_{1,4}$ from offer 1 and the corresponding stream localisations $LN_{1,1}$-$LN_{1,4}$.

The stream information table 703 contains the list of transport streams $TS_{2,1}$-$TS_{2,3}$ from offer 2 and the corresponding stream localisations $LN_{2,1}$-$LN_{2,3}$.

The tables 701-703 are inserted into XML textual files which are in turn prepared to be transmitted over the IP broadband network (not shown).

The table 701 is cyclically multicast at a predetermined offer localisation $LN_{0,0}$ which is known by the STB. Hence the STB will know from where to obtain the offer information, which is required to obtain a transport stream.

The tables 702 and 703 are cyclically multicast respectively at the service provider offer localisations indicated in the table 701 of offer information, i.e., at the service provider offer localisations $LN_{0,1}$ and $LN_{0,2}$.

Stream Discovery Information

Figure 10:
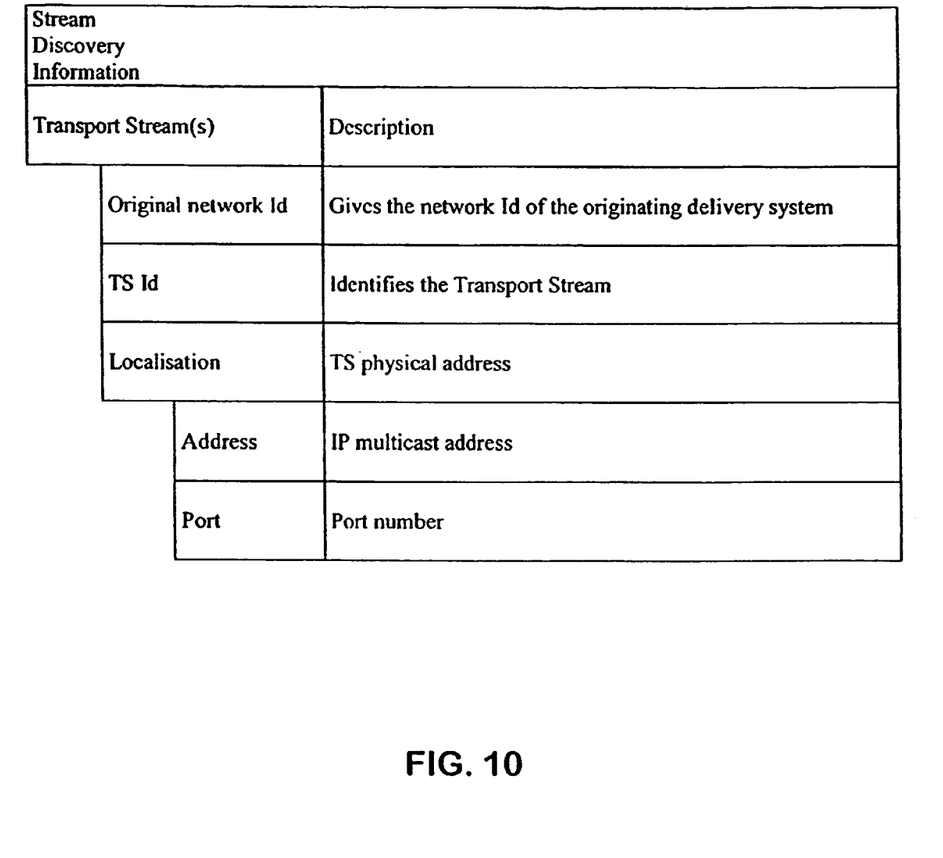
FIG. 10 contains a table illustrating an example of stream discovery information according to the invention.

A table in FIG. 10 illustrates a further example of fields which may be included in stream discovery information. The following description of the fields is made in reference to FIG. 10.

Stream discovery information may comprise information about one or a plurality of Transport Streams (TS).

For each TS the following fields may be indicated:
an original network identification (Id),
a TS Id, and
a localisation.

The original network Id is a parameter that identifies a network used to initially provide the TS, before the TS is converted for delivery over the IP multicast delivery network.

The TS Id is a parameter that identifies a Transport Stream.

Both the original network Id and the TS Id are parameters used for example in the local DVB standard, as part of DVB Service Information.

A combination of the original network Id and the TS Id as presented in this example allows each TS to be uniquely identified in the IP multicast network. Hence, a service transported in a TS and having a service Id, may be uniquely referenced through a path "original network Id/TS Id/service Id".

The localisation comprises information that allows to localise a TS in the IP multicast network. The localisation comprises an IP multicast address and a port number for the TS.

In a preferred embodiment of the present example, the Stream Discovery Information may comprise an Identifier for the MSO that provides the Transport Stream(s) and a Version number that indicates a version number of the Stream Discovery Information. The version number may be incremented every time a change in the Stream Discovery Information is made.

Use of Discovery Information in the STB

It is understood that the STB is basically compliant to a regional standard, for example DVB compliant for the processing of MPEG-2 transport streams, i.e., it may process DVB transport streams and the corresponding DVB St service information. This is well known in the art and will not be described here in any more detail.

One difference of the inventive STB as compared to a standard DVB compliant STB, is that it must be enabled to obtain the transport stream from a stream localisation in the IP broadband network, the transport stream being multicast at the stream localisation.

Hence, any request from the STB which aims at accessing a service located in a determined transport stream, as determined through relevant DVB service information, will make use of discovery information gathered from multicast offer and stream information.

When requesting a transport stream, the receiver uses a same transport stream identification as in DVB-SI. However, instead of tuning to a frequency read from a table and corresponding to the frequency at which the transport stream may be received, as is the case in DVB bundles, the tuner looks up a table of multicast localisations and reads the IP address and port pair (stream localisation) from which the transport stream may be obtained.

This table is compiled from multicast offer and stream information, and stored into the STB.

All further processing of the transport stream in itself and of DVB service information is done according to known methods well described in prior art. DVB service information contained in the transport streams may for example be used to build an Electronic Program Guide.

Figure 8:
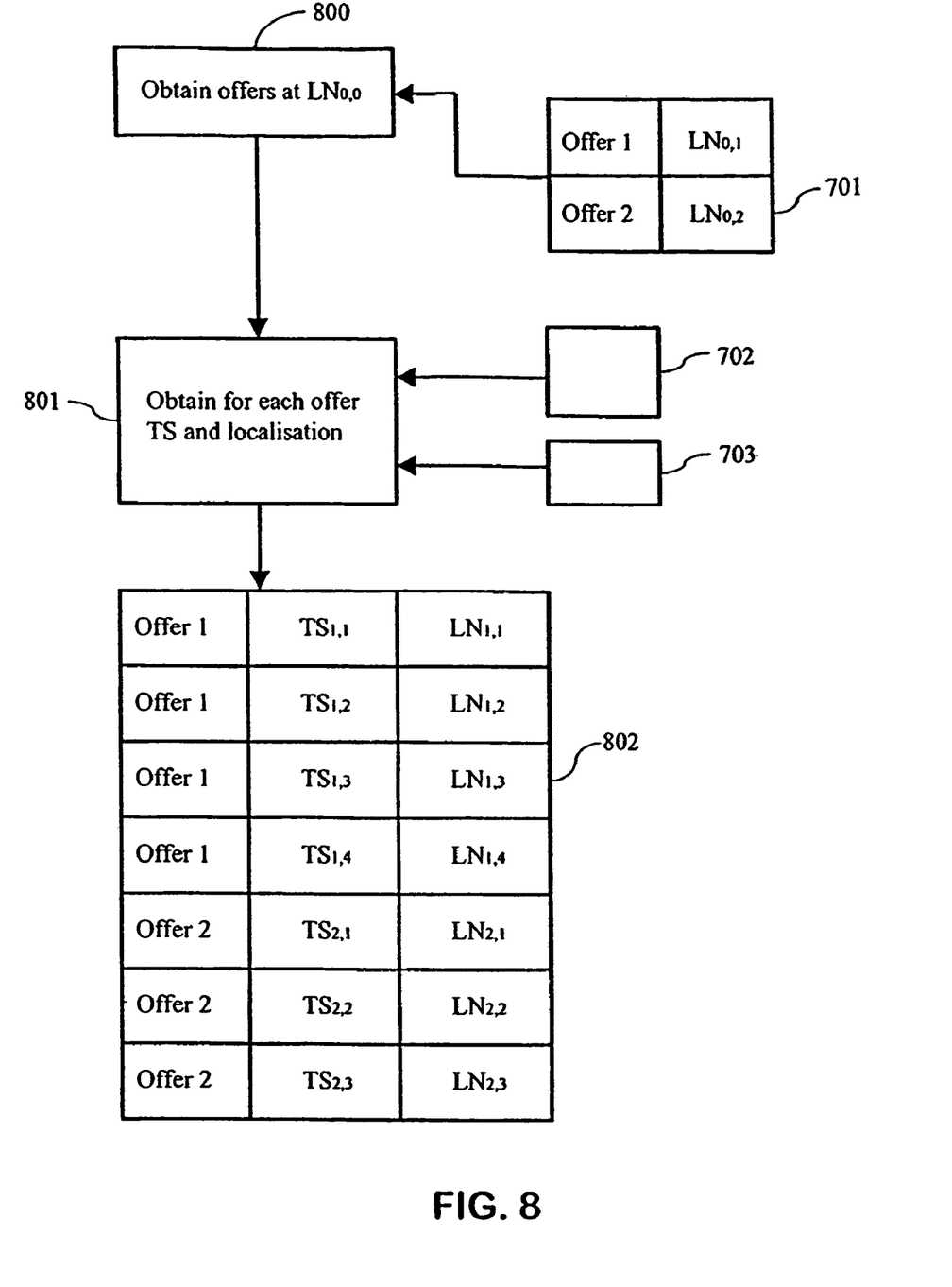
FIG. 8 contains a flowchart explaining an example of processing discovery information at a STB according to the invention.

An example of processing offer and stream information will now be described together with FIG. 8. The example is based on the offers 1 and 2 described in relation to FIGS. 6 and 7.

In box 800, the STB obtains at the predetermined offer localisation $LN_{0,0}$ the table 701 of offer information. The STB processes the offer information to extract for each offer, i.e., offer 1 and 2, the service provider offer localisations $LN_{0,1}$ and $LN_{0,2}$ at which stream information may be obtained.

The stream information is obtained in box 801 from the service provider offer localisations, and a table 802 listing for each offer, the stream localisation at which a transport stream is multicast by the ISP, is compiled and stored into the STB.

Figure 9:
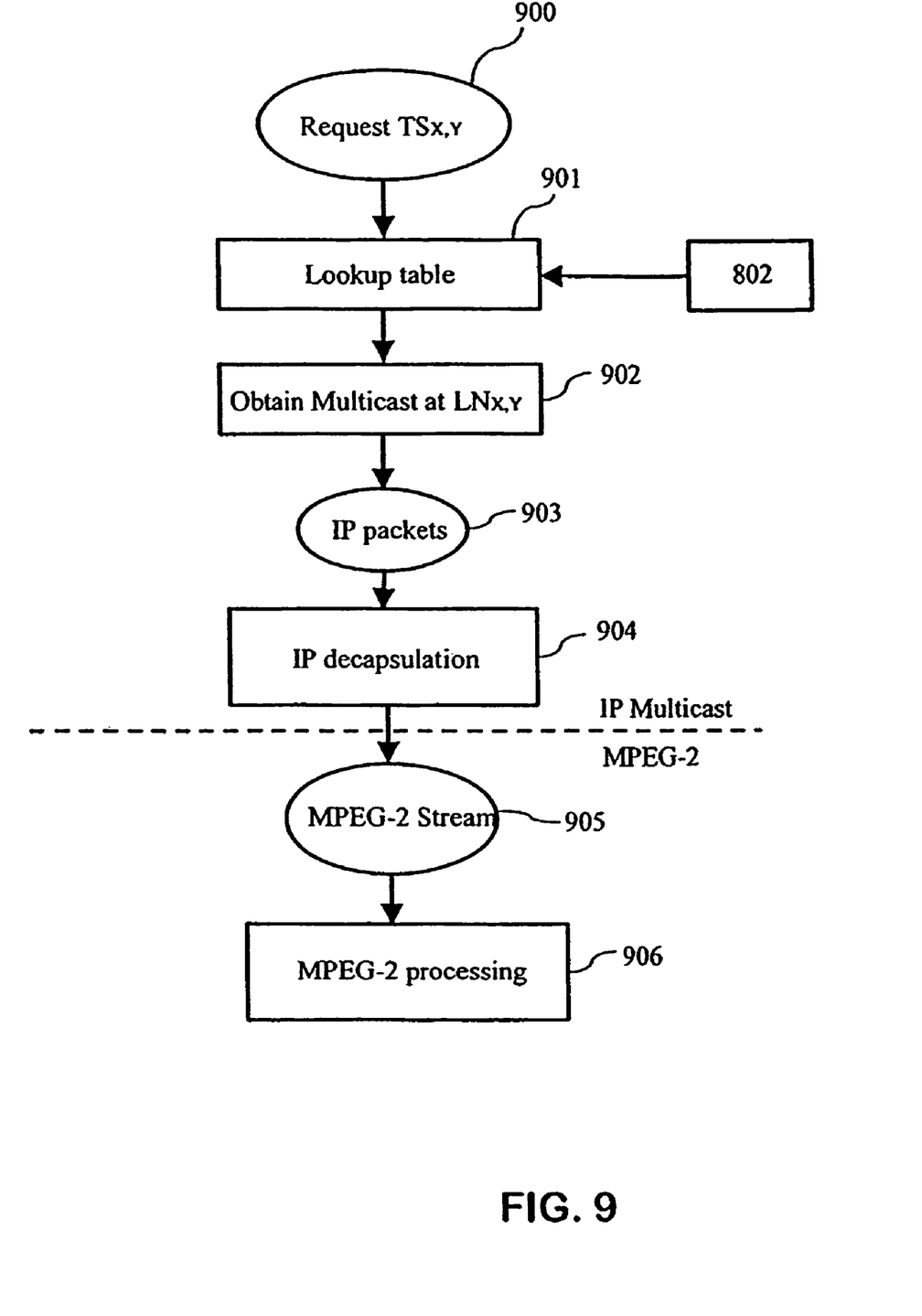
FIG. 9 contains a flowchart explaining an example of obtaining a transport stream in a STB according to the invention.

The table 802 is used by the STB to identify at which stream localisation a stream may be obtained. This is illustrated in FIG. 9. Following a request 900 for a transport stream $TS_{X,Y}$, e.g., a request generated by an application running in the STB, the table 802 (known from FIG. 8) is looked up in box 901, and the stream localisation $LN_{X,Y}$ retrieved. In a next step 902 the multicast transport stream $TS_{X,Y}$ is obtained from stream localisation $LN_{X,Y}$, in form of IP packets 903. The MPEG-2 packets of the transport stream are extracted through IP decapsulation in 904. The MPEG-2 transport stream is obtained for further processing by the MPEG-2 part of the STB in 906.

Having described preferred embodiments of the invention with reference to the accompanying drawings, it is to be understood that the invention is not limited to these precise embodiments and that various changes and modifications could be effected therein by a person skilled in the art without departing from the spirit or scope of the invention as defined in the appended claims.

The invention claimed is:

1. A method for distributing discovery information in an IP multicast television network, comprising:
multicasting offer information linking a service provider offer description and a service provider offer localization within the IP multicast television network, wherein the offer information is multicast at a predetermined offer localization known to a set top box associated with a subscriber, and
multicasting stream information at the service provider offer localization, the stream information linking a multi-service transport stream and a stream localization within the IP multicast network, wherein the multi-service transport stream is multicast at the stream localization,
wherein the service provider offer localization and the stream localization are different, and
wherein the service provider offer localization comprises a first IP address and a first port and the stream localization comprises a second IP address and a second port, wherein the first IP address and the second IP address are different, wherein the first port and the second port are different, and wherein the first port and the second port are each configured to receive data transmitted over the IP multicast television network.

2. The method according to claim 1, in which the offer and stream information are respectively cyclically multicast.

3. A method for broadcasting over an IP multicast network at least one offer of multimedia services received in a form of a bundle of transport streams, comprising:
attributing, for each offer, a determined service provider offer localization within the IP multicast network,
creating a file of offer information describing, for each offer, a relation to its attributed service provider offer localization,
extracting, for each offer, transport stream information from the bundle of transport streams, the transport stream information comprising a transport stream identification for each transport stream,
attributing for each transport stream identification a determined stream localization within the IP multicast network, wherein each transport stream in the bundle of transport streams is multicast at the determined stream localization, wherein the service provider offer localization comprises a first IP address and a first port and the stream localization comprises a second IP address and a second port, wherein the first IP address and the second IP address are different, wherein the first port and the second port are different, and wherein the first port and the second port are each configured to receive data transmitted over the IP multicast network, and creating, for each offer, a file of stream information describing for each transport stream a relation to its attributed stream localization, wherein the service provider offer localization and the stream localization are different.

4. The method for broadcasting according to claim 3, further comprising adding, for each offer, a service provider offer description in the file of offer information.

5. The method for broadcasting according to claim 3, wherein the extraction of transport stream information from the bundle comprises:

for each transport stream, extracting an original network Id for a network previously used to deliver the transport stream, and inserting the original network Id in relation to the transport stream in the file of stream information.

6. The method for broadcasting according to claim 3, further comprising:

receiving, for each transport stream, a corresponding stream of packetized data, inserting the stream of packetized data into IP packets, multicasting the IP packets at the stream localization previously attributed to the transport stream, multicasting the file of offer information at a predetermined offer localization, and multicasting, for each offer, the corresponding stream information file at the service provider offer localization attributed to the offer.

7. The method according to claim 6, in which the files of offer and stream information are respectively cyclically multicast.

8. A method for receiving, in a set top box receiver compliant to receive a bundle of transport streams and connected to an IP multicast network, a transport stream from a bundle, comprising:

obtaining multicast stream information from a service provider offer localization, processing the stream information to determine a stream localization previously attributed to the transport stream, wherein the service provider offer localization comprises a first IP address and a first port and the stream localization comprises second IP address and a second port, wherein the first IP address and the second IP address are different, wherein the first port and the second port are different, and wherein the first port and the second port are each configured to receive data transmitted over the IP multicast network, obtaining multicast IP packets associated with the transport stream from the determined stream localization, and extracting packetized data from the obtained IP packets, thereby obtaining the transport stream, wherein the service provider offer localization and the stream localization are different.

9. A method for receiving, in a set top box receiver compliant to receive a bundle of transport streams and connected to an IP multicast network, a transport stream from an offer among one or many offers in the form of bundles, comprising:

obtaining multicast offer information from a predetermined offer localization, processing the offer information to obtain a determined service provider offer localization previously attributed to the offer, obtaining multicast stream information from the determined service provider offer localization, processing the stream information to determine a stream localization previously attributed to the transport stream, wherein the service provider offer localization comprises a first IP address and a first port and the stream localization comprises second IP address and a second port, wherein the first IP address and the second IP address are different, wherein the first port and the second port are different, and wherein the first port and the second port are each configured to receive data transmitted over the IP multicast network, obtaining multicast IP packets associated with the transport stream from the stream localization, and extracting packetized data from the obtained IP packets, thereby obtaining the transport stream, wherein the service provider offer localization and the stream localization are different.

10. A method for receiving, in a set top box receiver compliant to receive a bundle of transport streams and connected to an IP multicast network, a transport stream from an offer among one or many offers in form of bundles, comprising:

obtaining multicast offer information from a predetermined offer localization, processing the offer information to obtain a list of items, each item relating a service provider offer localization and an offer, obtaining, for each item from the list of items, multicast stream information from the service provider offer localization corresponding to the item, processing the stream information to obtain a transport stream list of transport streams and respectively related stream localizations, wherein the service provider offer localization comprises a first IP address and a first port and the stream localization comprises second IP address and a second port, wherein the first IP address and the second IP address are different, wherein the first port and the second port are different, and wherein the first port and the second port are each configured to receive data transmitted over the IP multicast network, and storing the transport stream list in the set top box, wherein the service provider offer localization and the stream localization are different.

11. The method for receiving according to claim 10, further comprising:

requesting a determined transport stream, finding a stream localization corresponding to the determined transport stream in the transport stream list, obtaining multicast IP packets from the stream localization, and extracting packetized data from the obtained IP packets, thereby obtaining the determined transport stream, wherein the determined transport stream combines offers for multimedia services from a plurality of service providers, each of which broadcast using a different distribution system.

* * * * *